Figure 2:
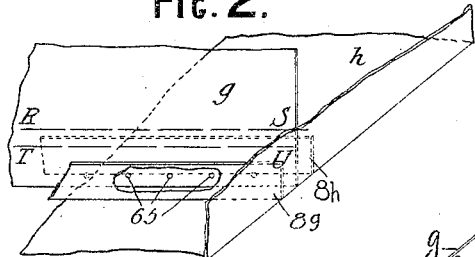

H. L. DOHERTY.
PROCESS FOR RECOVERING COMBINED AMMONIA FROM GASES.
APPLICATION FILED FEB. 15, 1910.

1,043,210.

Patented Nov. 5, 1912.

3 SHEETS—SHEET 1.

Witnesses:
L. G. Coleman
Thos. J. Carter

Henry L. Doherty, Inventor
By his Attorney Frank L. Young

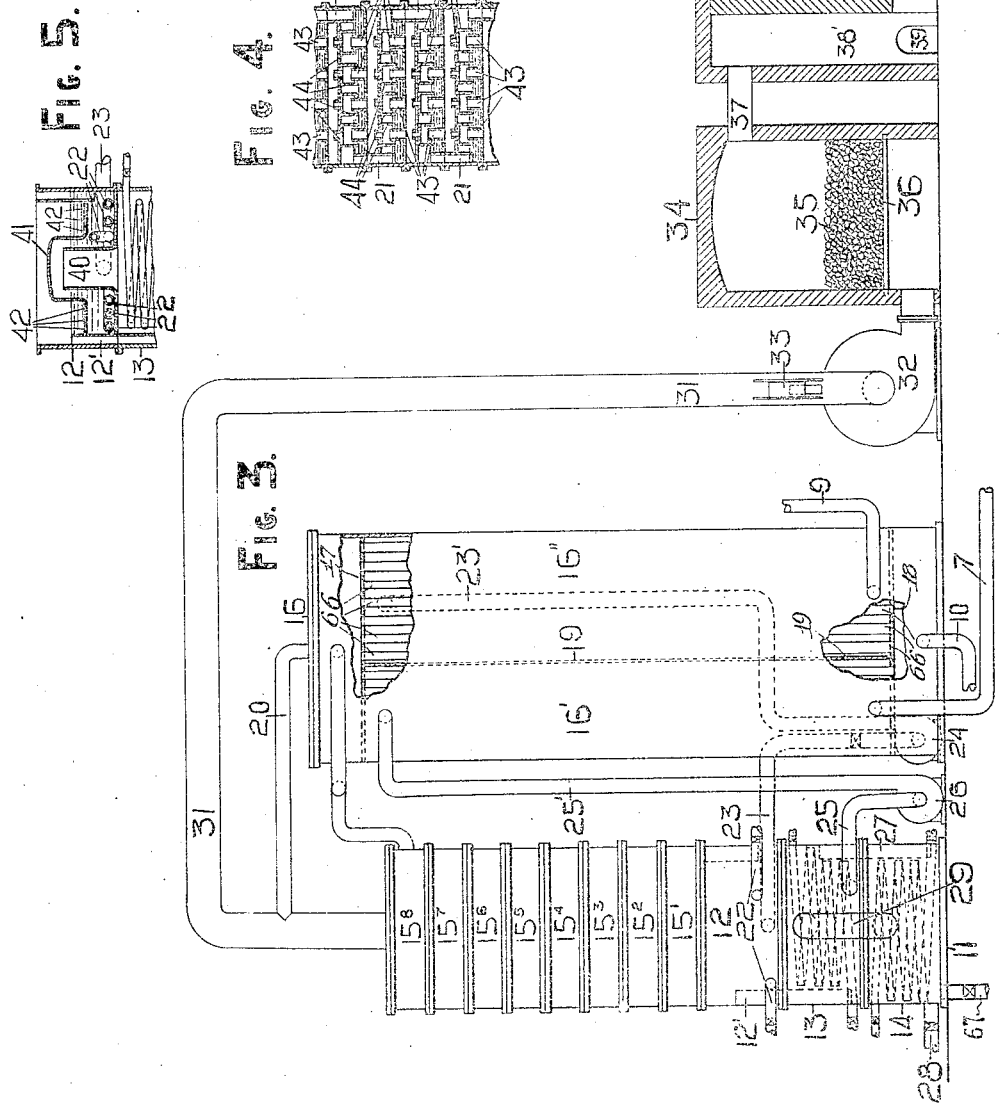

H. L. DOHERTY.
PROCESS FOR RECOVERING COMBINED AMMONIA FROM GASES.
APPLICATION FILED FEB. 15, 1910.

1,043,210.

Patented Nov. 5, 1912.

3 SHEETS—SHEET 3.

Witnesses:
R. G. Coleman
Thos. J. Carter

Henry L. Doherty, Inventor
By his Attorney Frank S. Young.

ic

UNITED STATES PATENT OFFICE.

HENRY L. DOHERTY, OF NEW YORK, N. Y.

PROCESS FOR RECOVERING COMBINED AMMONIA FROM GASES.

1,043,210.  Specification of Letters Patent.  Patented Nov. 5, 1912.

Application filed February 15, 1910. Serial No. 544,094.

*To all whom it may concern:*

Be it known that I, HENRY L. DOHERTY, a citizen of the United States, and a resident of New York city, in the county of New York and State of New York, have invented certain new and useful Improvements in Processes for Recovering Combined Ammonia from Gases, of which the following is a specification.

My invention relates to a process for recovering combined ammonia from gases, and, in particular, to such a process in which the ammonia is fixed by either or both sulfur acids derived from sulfur compounds of the ammonia-bearing gases or by the carbon dioxid of said gases. Thus I fix the ammonia of the gases by chemical substances which occur as impurities in the ammonia-bearing gases and, in the case of coal gases, are formed contemporaneously with the ammonia itself.

In my copending application Ser. No. 544,095, filed Feb. 15th, 1910, I have described and claimed a modification of the herein-revealed invention.

The object of my invention is to provide a process, whereby the ammonia occurring in industrial gases such as the gases from the destructive distillation of coal may be converted into a salt consisting, usually, chiefly of ammonium sulfite mixed with ammonium sulfate and some ammonium carbonate, by means of sulfur acids formed from the sulfur of the hydrogen sulfid (or other sulfur compound) formed during the manufacture of the gas, and the carbon dioxid likewise formed, when the sulfur content of the gases is not sufficient to fix all of the ammonia. This latter condition may obtain, in practice, chiefly in producer gases made by the various processes of gasification. In the distillation gases from coal, the sulfur content of the gases is usually more than sufficient to fix all of the ammonia.

In the usual manner of fixing the ammonia formed in the distillation or gasification of coal, the ammonia-bearing gases are conducted through a suitable chamber in which they are contacted with separately manufactured sulfuric acid, fixing the ammonia as ammonium sulfate. This product is used as the source of ammonia for various industrial purposes but, chiefly, as a fertilizer. By my method, I am able to fix the ammonia in a form that is just as available as the sulfate without the necessity of using any chemical reagents other than those obtained from the coal at the same time as the ammonia.

Briefly, my invention consists in absorbing the ammonia, hydrogen sulfid and carbon dioxid of the gas in a partially purified ammonia liquor containing a substantial proportion of its ammonia in the free or hydrated condition, separating again from the foul liquor formed by contacting the partially purified liquor with the crude gas, a proportion of its ammonia and acid gases ($CO_2$ and $H_2S$) approximately corresponding to the quantity of such constituents which the liquor had absorbed from the crude coal gas, adding sufficient oxygen to said separated gases to oxidize the hydrogen sulfid contained therein, conducting the mixture of separated gases and air through a bed of iron oxid (or other suitable catalytic material) maintained at a reactive temperature, whereby the hydrogen sulfid in said gases is oxidized to form water vapor, sulfurous and sulfuric anhydrid, and cooling the gases after their passage through said catalytic material, whereby there is recovered a mixture of ammonium sulfite and sulfate.

Figure 1:
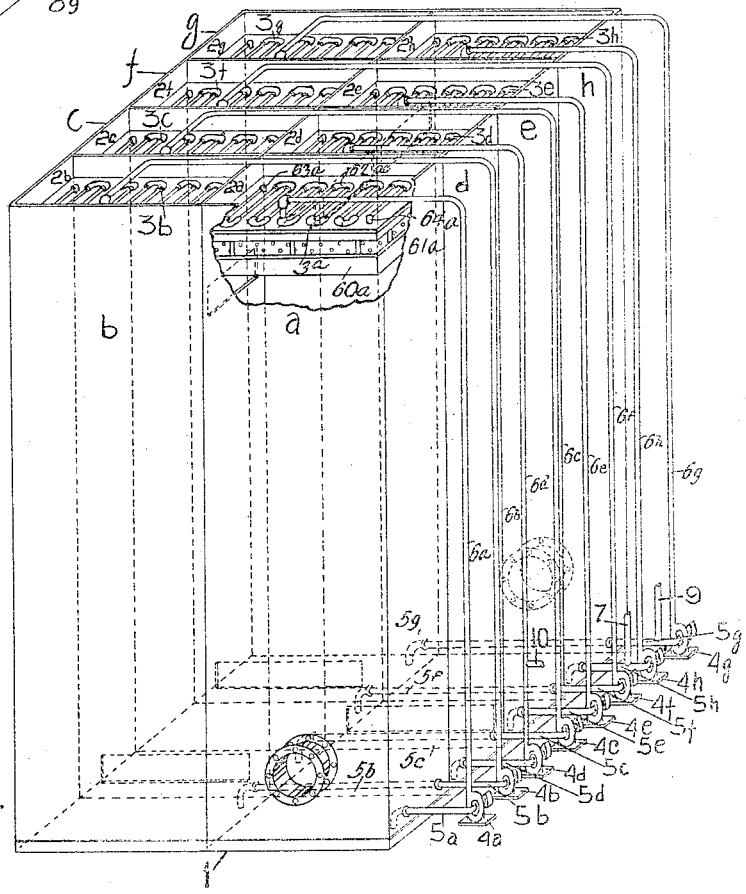
Figure 6:
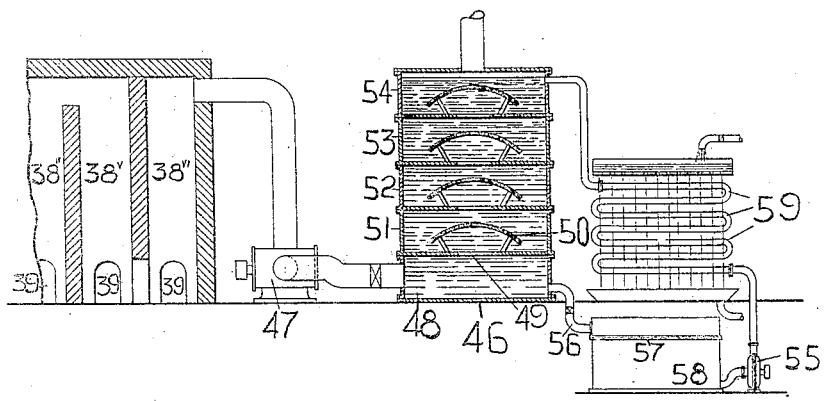

In the accompanying drawings, Figure 1 is a perspective view of the gas cooling and scrubbing apparatus. Fig. 2 is a detail of the same showing how the scrubbing liquor passes from compartment to compartment of said apparatus. Figs. 3 and 6, taken together, show in part a diagrammatic elevation and in part a section of the apparatus for separating the ammonia and sulfur gases from the scrubbing liquor and making the fixed ammonia salts therefrom with the heat interchanger shown in part section. Fig. 4 is a detail of the still shown in Fig. 3. Fig. 5 is a vertical diametral section through the heating compartment 12 and upper part of the boiling compartment 13 of the still shown in Fig. 3.

In the drawings, 1 is the absorption apparatus. This is divided into a plurality of compartments, $a$, $b$, $c$, $d$, $e$, $f$, $g$ and $h$, in the design shown, each compartment having located above it a compartment ($2_a$, $2_b$, $2_c$, etc., respectively,) in which is a cooling coil ($3_a$, $3_b$, etc.,) through which the liquor used in the compartment, to wash the gas, is passed, for the purpose of cooling it, before introducing it into the compartment in contact with the gas. The cooling is performed, in the apparatus shown, by the circulation of a cooling liquid around the coils in the compartments 2. Circulating pumps, $4_a$, $4_b$, etc., maintain a constant circulation of liquor from the bottoms of the compartments to the respective cooling coils. After passing through the coils 3, the liquor passes through some suitable distributing device, which should secure a uniform distribution of the liquid across the cross-section of the compartment. In Fig. 1 is shown a part perspective of the distributing device for chamber $a$. This distributing device comprises a tray $60_a$, having a perforated bottom $61_a$. The aggregate area of the perforations should be such relative to the volume of liquor circulating that there will always be a substantial depth of liquor on the bottom $61_a$ of the tray $60_a$. Any variation in the rate of circulation of the liquor is automatically taken care of by the increased rate at which the liquor passes through $61_a$ with the increase in head of liquor in $60_a$ and vice versa by the diminution of flow with the fall of head in $60_a$. The sheet $62_a$ forms the top of compartment $a$ and at the same time the bottom of the cooling compartment $2_a$. As shown, the liquor enters the middle portion of the coil $3_a$, and flowing each way, discharges through the respective connections $63_a$ and $64_a$ on to the distributing tray $60_a$, and thence passes through the perforations of the bottom $61_a$ into the chamber $a$. The method of distribution of the scrubbing liquid is the same in all of the compartments. These compartments, $a$, $b$, $c$, etc., generally contain a structure of grids or trays over the surface of which the liquid finds its way to the bottoms of the compartments to be again circulated through the respective cooling coils and the compartments. The surface of the grids (or whatever form of filling is used) is thus kept constantly wetted. The gas passes through the interstices of the grid structure and is thus brought into intimate contact with the scrubbing liquid.

In compartment $h$, the gas which, here, should contain only a trace of $NH_3$, and the acid gases, $H_2S$, $CO_2$, are subjected to scrubbing by a portion of previously formed ammonia liquor, which has been freed, in the manner hereinafter described, from substantially all of its volatilizable compounds which is conducted to the compartment $h$ through pipe 7. The extent to which it is necessary to remove the volatilizable gases from this portion of the liquor depends, in great measure, upon the temperature that prevails in $h$. While ammonia has a considerable affinity for water, even weak solutions of $NH_3$ in water possess an appreciable vapor tension, at ordinary temperatures. It is necessary that the liquor used for scrubbing in $h$ should have a vapor tension of its $NH_3$ less than the tension of the small quantity of $NH_3$ in the gas passing through compartment $h$. Usually, the final traces of $NH_3$ are removed from the gas by scrubbing with fresh water. By my method, however, I prefer to use liquor that has been freed from its volatile ammonia in order to avoid the dilution of the liquor that is occasioned by the use of fresh water. The liquor in $h$, is maintained in circulation by pump $4_h$, as already explained. A portion of this liquor, corresponding to the volume of fresh liquor introduced through pipe 7, overflows to compartment $g$, through the sealing device shown on an enlarged scale in Fig. 2, and mixes with the liquor circulating in compartment $g$.

The sealing device shown is formed by two baffles, $8_h$ and $8_g$ respectively, spaced away from the wall dividing $h$ from $g$. The lower part of the dividing wall is pierced with numerous apertures 65. Under normal conditions of working the liquor level in the bottom of compartment $h$ would be at considerable height above the baffles $8_h$ and $8_g$—say at the level RS. Since in normal working a portion of the liquor is constantly withdrawn from one of the compartments—$d$ for example—the level of liquor in this compartment tends to fall. This causes a flow of liquor from the next communicating compartment $e$, through a sealing device similar to the one described above, which in turn causes a flow of liquor from $f$ to $e$ and so on. Owing to the friction of the gas passing through the compartments and the connecting ports, there is a slight graduated fall in pressure at a given level in each of the compartments from $a$ to $h$. For this reason, the difference in level of the liquor between any two adjacent compartments is greater than that which would be required to produce the necessary flow of liquor from compartment to compartment were the gas pressures in the adjacent compartments equal. This is indicated by the line T—U of Fig. 2, which may be taken to indicate the liquor level in compartment $g$.

The liquor is introduced to $g$ by the pipe 9, connected, in the arrangement shown, to the suction pipe, $5_g$, of pump $4_g$, and is circulated in the manner described, a volume of liquor corresponding to the overflow from $h$ and the quantity of purified liquor introduced through 9, overflows to compartment $f$. The liquor flows in this way from compartment to compartment, a volume being maintained in circulation in each compartment much greater than the volume of the flow from compartment to compartment. The volume of liquor supplied through the pipes 7 and 9 depends, in great measure, upon its content of free ammonia. It is necessary to introduce in the liquor supplied through 7 the quantity of free ammonia that will suffice, in connection with the ammonia already present in the gas, to form sulfid and carbonate, respectively, with the $H_2S$ and $CO_2$ of the foul gas. When the proper quantity of free ammonia is supplied in the liquor, substantially all of the $H_2S$, $CO_2$ and $NH_3$ is removed from the foul gas. In my preferred method of working, I withdraw the liquor bearing the $H_2S$, $CO_2$ and $NH_3$ from compartment $d$, through pipe 10, and run it to the ammonia salt recovery plant. This is shown, diagrammatically, in Figs. 3 and 6.

11 is the still in which the impurities removed from the gas are separated again from the liquor, and about one-half or more of the ammonia in the latter again converted to the free or hydrated condition. 11 has in its lower portion three heating chambers, 12, 13 and 14. Upon the uppermost of these chambers, 12, is built up the still proper. This is composed of a plurality of sections, $15^1$, $15^2$, $15^3$, etc., arranged as shown in Fig. 4.

16 is a heater-cooler, or heat-interchanger, consisting of a cylindrical tank having an upper and lower tube-sheet (17 and 18, respectively,) with tubes 66 supported thereby. The chamber, included between the tube-sheets, is divided, by partition 19, into two compartments, 16' and 16''. The liquor passing through pipe 10, which contains the $NH_3$, $H_2S$ and $CO_2$ absorbed from the gas, enters 16 below the tube-sheet 18 and passes up through the tubes 66 to the space above the upper tube-sheet 17. During its upward passage through the tubes, the liquor is heated by two streams of hot liquor passing in the reverse direction through the compartments 16' and 16''. Now the ammonium sulfid of the liquor begins to dissociate at a temperature as low as 98° Fah. although complete dissociation is effected only at a much higher temperature. The ammonium carbonate begins to dissociate at about 124° Fah. Some dissociation, therefore, takes place even in the heater-cooler, with the evolution of $H_2S$ and $CO_2$. This dissociation of the ammonia salts causes an appreciable absorption of heat which is rendered latent and thus increases the thermal capacity of the foul liquor with a consequent increase in the efficiency of the heater-cooler. The gases evolved from the liquor in the course of this heating discharge from 16 through the pipe 20 into the pipe 31 carrying off the effluent gases from 11. The heated liquor from 16 enters the uppermost section ($15^8$ as shown). From $15^8$ it overflows from section to section through the sealed overflow passages 21 into the upper heating compartment 12. As the liquor passes through the sections 15, it is subjected to the action of the hot gases discharging from the compartment 12. More of its ammonium sulfid and carbonate are therefore decomposed with the evolution from the liquor of the hydrogen sulfid and carbon dioxid of the salts so decomposed. The hot gases from 12 which bubble through it, while eliminating part of the $H_2S$ and $CO_2$ from the foul liquor at the same time give up the larger portion of the $NH_3$, which they carry, to the liquor, since the affinity of the $NH_3$ for the water is much stronger than that of the other gases, mentioned. The heat absorption attendant upon the dissociation of the ammonium salts assists materially in the cooling of the effluent gases from 12. In the heating chamber 12, the liquor is heated to a temperature that is, preferably, from 6 to 12 degrees below the boiling point of water, at the pressure prevailing in 12. This pressure, of course, depends upon the altitude of the locality in which the process is being carried out and upon the back pressure caused by the liquid seals in the compartments of the still.

I aim to carry on the operation in 12, as stated, at a temperature varying from 6 to 12 degrees below the boiling point of water under the pressure prevailing in 12. For example, if the barometric pressure in 12, is about 25.9 inches of mercury I would preferably maintain the temperature at about 197° to 198° Fah., while at a barometric pressure of, say, 31.3 inches in 12, I would preferably heat the liquor therein at a temperature of about 204° Fah. While purification can be effected considerably below this temperature, I find the rate of purification at a lower temperature so slow that, ordinarily, I do not consider it advisable to use temperatures lower than those given, although the separation of the foul gases and the ammonia may be thereby made with less loss of ammonia in the one operation. At this range of temperature, 197°–204°, the decomposition of the ammonium sulfid and carbonate is very rapid. The freed foul gases pass off very rapidly from the liquor, setting up a pseudo ebullition. A portion of the ammonia also passes off with the foul gases, the carrying off of the ammonia being, in part, mechanical. The greater part of the ammonia liberated in the dissociation of the ammonium salts is retained in the liquor owing to the relatively great absorption coefficient of water for ammonia, at even the temperature prevailing in 12. The liquor discharging from 12 is divided into two streams; the main stream is drawn off from 12 through pipe 23, and forced by pump 24 to the top of compartment 16'' of heater-cooler 16. The other stream is permitted to pass through the overflow 12' into the boiling compartment 13. The liquor after passing through 12, will have had about 50 to 60% of its original H₂S and CO₂ eliminated, with a loss of only about 8% of its ammonia. The residual ammonia is present as free or hydrated ammonia to the extent of about 50 to 55% of the total. By decreasing the velocity of flow, it is possible to increase this proportion of free ammonia, but, at the expense of the production of a weaker liquor. Therefore, I have found that the method of working outlined gives the most economical results. I aim to drive off from the liquor in 11, just about the proportions of ammonia and acid gases, which correspond to the increments of those gases, which are received by the liquor in passing through the gas washer 1.

In compartment 13, the portion of the purified liquor from 12, which passes thereinto, is subjected to active boiling, until the $NH_3$, $CO_2$ and $H_2S$ have been, substantially, completely driven off. The evolved gases, together with the steam generated, pass through the liquid in 12 through a sealing device shown in Fig. 5. The gases from 13 pass up through the vapor pipe 40 under the hood 41. The pressure builds up under the hood until the liquor sealing the perforations 42, in the flange of the hood 41, has been depressed sufficiently to unseal the perforations 42, when the gases pass through 42 and bubble up through the body of liquor in 12, which absorbs part of the contained ammonia from the gases, increasing its strength and purity. The unabsorbed portion of these gases passes in admixture with the gases driven off in 12, through the liquid seals in the upper sections. Part of the $NH_3$ evolved in 13 is taken up again by the liquor in 12, but the $CO_2$ and $H_2S$ pass through without being absorbed, owing to the temperature in 12. The boiled liquor discharging from 13 is subdivided into two streams, one being drawn off through pipe 25, and raised by pump 26 to the top of compartment 16'. The other subdivision of the liquor passes through the overflow, 27, into the liming compartment, 14. The liquor leaving 13 contains only the fixed salts of ammonia—sulfate, chlorid, etc. The proper quantity of milk of lime is run into 14, through the pipes 28, to combine with the acid of the fixed ammonium salts and liberate their $NH_3$. This $NH_3$ passes up through the pipe 29 into the vapor space of 13, and joins the gaseous current discharging from 13. The liquor discharging from 14, which has been freed from all of its ammonia, both volatile and fixed, is permitted to run to waste through the pipe 67. The cooled liquor discharging from compartment 16', passes directly to the circulating pump of compartment $h$ through the pipe 7, where it is used to remove the final traces of ammonia from the gas. It then enters compartment $g$ and joins the main stream of purified liquor entering that compartment. The effluent gases from 11, containing the $NH_3$, $CO_2$ and $H_2S$ evolved from the foul liquor flowing to 11, pass through the pipe 31, to blower 32. On the suction pipe of blower 32 is an air damper 33, through which the proper quantity of air is admitted to the gaseous current, passing through 31, to furnish the oxygen necessary to oxidize the sulfur of the $H_2S$ in the gases. The mixture of still gases and air next passes to the oxidizing chamber 34. This contains a bed of iron oxid, or some similar material, 35, supported by a grate, 36, the oxid being maintained, preferably, at or below an incipient red heat. In passing through the bed of oxid (or other similarly reacting material) the hydrogen sulfid of the gas current is oxidized to water and sulfurous and sulfuric anhydrid, the former greatly predominating. The reactions which take place with the oxid are cyclic in character, and, it is not necessary to consider them, the final result may be represented by the following equations, viz.:

(a.) $2H_2S + 3O_2 = 2H_2O + 2SO_2$
(b.) $2SO_2 + O_2 = 2SO_3$.

The proportion of $SO_3$ formed is relatively small, most of the sulfur being oxidized to $SO_2$. While gaseous $NH_3$, unmixed with any substance which has the property of forming a stable compound with it, is dissociated in the presence of heated oxid of iron to form water, free nitrogen and some nitrogen oxid, in the present case it is protected to a great extent by the $SO_2$ and $SO_3$ formed. These combine with the ammonia to form ammonium sulfite and sulfate, which remain suspended in the gaseous current as a heavy fume. After passing through 35, the gases are conducted through 37 to a series of settling chambers, 38', 38'', etc., where the fume is deposited on the walls and floor of the chambers and may be removed at intervals through the doors 39. When the sulfur gases present are sufficient to combine with all the ammonia the salt formed will consist principally of ammonium sulfite mixed with some bisulfite and sulfate. Some carbonate of ammonia will also be formed if the temperature of condensation is sufficiently low to permit of its formation. On the other hand, if there is a deficiency in the sulfur compounds present, the ammonium carbonate will be proportionally high. In this case, the temperature to which the gases are cooled in the condensation must be much lower than in the former case. Therefore I prefer, in this case, to supplement the condensing apparatus by a supplementary condenser, 46. The sulfur salts of ammonia are separated from the gas in the chambers 38. The operation is, preferably, so arranged that the effluent gases from 38 have a temperature somewhat above that at which the ammonium carbonate forms, say 150° Fah. The gases bearing the ammonia not condensed from 38 as a sulfur salt in 38, together with the carbon dioxid and water vapor, etc., are forced by blower 47 to the chamber 48 of condenser 46. This condenser is of a common type and any equivalent device may be substituted for it. The gases pass from chamber 48 up through the opening 49 under the perforated dome 50 in chamber 51. They bubble through the perforations in 50, through the liquor in 51, and on up through the sections 52, 53, etc., above. A mother liquor saturated by the ammonium salt is continuously circulated through the sections of 46 by the pump 55. The cold liquor cools the gases taking up the ammonium carbonate salt which, owing to the saturation of the liquor, immediately crystallizes out as the so-called sesquicarbonate of ammonia. The crystals work down with the liquor through the sections of 46 and are run out with the liquor through pipe 56 over the fine screen 57 in tank 58. This screen retains the crystals, which may be removed at intervals. The strained mother liquor collects in the bottom of 58 and is drawn off by pump 55 and forced through a cooling coil, 59, to the top of 46, to be again passed therethrough.

Of course, if preferred, a dry condenser may be used for the ammonium carbonate; but, I have found, that in separating this salt from an excess of diluent gases, it is difficult to secure a complete recovery of the ammonia by dry condensation.

Having described my invention, what I claim is:—

1. The process of recovering salts of ammonia from crude gas which comprises separating the contained ammonia, carbon dioxid and sulfur gases from the crude gas by absorption in a liquid, separating the said gases from said liquid, subjecting the said separated sulfur gases to oxidation in the presence of the said ammonia and recovering the salts of ammonia so formed.

2. The process of recovering salts of ammonia from crude gas which comprises separating the contained ammonia, carbon dioxid and sulfur gases from the crude gas by absorbing the said gases in a liquid, separating the said gases from said liquid, and oxidizing the said sulfur gases to a mixture of sulfurous and sulfuric anhydrids in the presence of said ammonia to form oxidized salts of ammonium.

3. The process of recovering salts of ammonia from an ammonia-and-sulfur-bearing gas which comprises separating the ammonia and sulfur constituents from the crude gas, contacting the said separated ammonia and sulfur constituents of the gas with a metallic oxid maintained at a reacting temperature, recovering the so-formed fixed sulfur salts of ammonia, and re-oxidizing said metallic oxid.

4. The process of making fixed ammonia salts containing a major proportion of ammonium sulfite, which comprises separating the ammonia, carbon dioxid and sulfur constituents of a crude gas from the said gas, adding to the separated gases sufficient oxygen to oxidize the sulfur of the same to sulfur dioxid and causing a reaction to take place between the sulfur containing gas and said oxygen in the presence of the ammonia of the said gases and recovering the fixed ammonium salts so formed.

5. The process of making ammonium sulfite which comprises separating the contained ammonia and hydrogen sulfid from a crude gas, adding to the separated gases sufficient oxygen to oxidize the hydrogen sulfid of the same to sulfurous anhydrid and water and passing the resulting gaseous mixture in contact with a suitable catalytic material, whereby ammonia of said gas mixture is converted into ammonia sulfite.

6. The process of making oxidized sulfur salts of ammonia which comprises separating from a crude gas the ammonia and sulfur gases which it contains, adding to the separated gases sufficient oxygen to oxidize the hydrogen sulfid of the same to sulfurous anhydrid and water and contacting the so-formed gas mixture with oxid of iron, whereby ammonia of said gas mixture is converted into oxidized sulfur salts of ammonia.

7. The process of making oxidized sulfur salts of ammonia which comprises separating from a crude gas, the ammonia and sulfur gases which it contains, adding to the separated gases sufficient oxygen to oxidize the hydrogen sulfid of the same to sulfurous anhydrid and water, contacting the so-formed gas mixture with oxid of iron at approximately an incipient red heat, whereby ammonia of said gas mixture is converted into oxidized sulfur salts of ammonia.

8. The process of making oxidized sulfur salts of ammonia which comprises separating from a crude gas, the ammonia and sulfur gases, which it contains, adding to the separated gases sufficient air to furnish the oxygen required to oxidize the hydrogen sulfid of the same to sulfurous anhydrid and water, contacting the so-formed gas mixture with oxid of iron at approximately an incipient red heat to oxidize the said hydrogen sulfid to water and a mixture of sulfurous and sulfuric anhydrids containing both substances in substantial proportions, combining the said ammonia with the said oxidized sulfur gases to form oxidized sulfur salts of ammonium, and subjecting the residual gases containing the so-formed ammonium salts to cooling to separate the said ammonium salts.

9. The process of recovering fixed ammonium salts from crude gas which comprises contacting said gas with a liquid capable of absorbing the ammonia, carbon dioxid and hydrogen sulfid of said crude gas, whereby the said constituents are separated from said gas, withdrawing said liquid from contact with said gas, subjecting said liquid to treatment to eliminate therefrom the ammonia, carbon dioxid and hydrogen sulfid separated from said crude gas, subjecting the gases eliminated from said liquid to an oxidizing action of such character that the sulfur of the contained hydrogen sulfid is oxidized while the contained ammonia remains substantially unoxidized, and combines with the oxidized compounds of sulfur formed and water, to form fixed salts of ammonia.

10. The process of recovering oxidized sulfur salts of ammonia from crude gas which comprises contacting said gas with a liquid capable of absorbing the ammonia and hydrogen sulfid of said crude gas, whereby the said constituents are separated from said gas, withdrawing said liquid from contact with said gas, subjecting said liquid to heating to eliminate therefrom the ammonia and hydrogen sulfid separated from said crude gas, contacting the separated ammonia and hydrogen sulfid with a metallic oxid which will yield up part of its oxygen to oxidize said hydrogen sulfid to water, sulfur dioxid and sulfur trioxid which, in the presence of the ammonia, combine with the latter to form ammonium sulfite and sulfate.

11. The process of recovering oxidized sulfur salts of ammonium from crude gas which comprises contacting said gas with a liquid capable of absorbing the ammonia and hydrogen sulfid of said crude gas, whereby the said constituents are separated from said gas, withdrawing said liquid from contact with said gas, subjecting said liquid to heating to eliminate therefrom the ammonia and hydrogen sulfid absorbed by said liquid from said crude gas, contacting the separated ammonia and hydrogen sulfid with oxid of iron maintained at a temperature such that it will give up part of its oxygen to oxidize said hydrogen sulfid to water, sulfur dioxid and sulfur trioxid which, in the presence of said ammonia, combine with the latter to form ammonium sulfite and sulfate, restoring to said iron oxid the oxygen given up by the same to said hydrogen sulfid and recovering the ammonium salts formed.

12. The process of recovering oxidized sulfur salts of ammonium from crude gas which comprises contacting said crude gas with a liquor containing hydrated ammonia, whereby the ammonia, hydrogen sulfid and carbon dioxid of said crude gas are absorbed by said liquor, withdrawing said liquor from contact with said gas, subjecting said liquor to heating, whereby ammonia, hydrogen sulfid and carbon dioxid are evolved from said liquor, oxidizing said hydrogen sulfid to water vapor and oxids of sulfur in the presence of said ammonia and carbon dioxid, whereby the said water vapor and oxids of sulfur combine with said ammonia to form sulfite and sulfate of ammonium, and separating the ammonium salts formed from the residual gases.

13. The process of recovering oxidized sulfur salts of ammonium from crude gas which comprises contacting said gas with a liquor containing a sufficient proportion of free ammonia to combine with the uncombined acid constituents of said crude gas, whereby the ammonia, hydrogen sulfid and carbon dioxid of said crude gas are absorbed by said liquor, withdrawing said liquor from contact with said gas, subjecting said liquor to heating at a temperature above the dissociation temperature of the volatilizable ammonium salts of said liquor but below the boiling temperature of said liquor, whereby a major portion of the hydrogen sulfid and carbon dioxid and a minor portion of the ammonia of said liquor are distilled therefrom, mixing with the said distilled gases sufficient oxygen to oxidize the contained hydrogen sulfid of said distilled gases, contacting such gas mixture with a catalytic material capable of reacting to transfer said oxygen to the elements of said hydrogen sulfid, whereby the latter is oxidized to water and oxid of sulfur which, in the presence of said ammonia, combine with the same to form oxidized sulfur salts of ammonium.

14. The process of recovering oxidized sulfur salts of ammonium from crude gas which comprises contacting said crude gas with a liquor containing hydrated ammonia, whereby the ammonia, hydrogen sulfid and other impurities of said crude gas are absorbed by said liquor, withdrawing said liquor from contact with said gas, subjecting said liquor to heating at a temperature between 190° and 200° Fah., whereby a major proportion of the hydrogen sulfid and other acid gases and a minor proportion of the ammonia of said liquor are distilled therefrom mixing with the said distilled gases sufficient oxygen to oxidize the contained hydrogen sulfid of said distilled gases, contacting such gas mixture with oxid of iron maintained at a temperature such that it will react to transfer the oxygen of said gas mixture to the said hydrogen sulfid, whereby the latter is oxidized to water and oxid of sulfur, which in the presence of the ammonia in said gas mixture combine with the same to form an oxidized sulfur salt of ammonium.

15. The process of recovering oxidized sulfur salt of ammonium from crude gas which comprises contacting said gas with a liquor containing free ammonia, whereby the ammonia, hydrogen sulfid and other constituents of said crude gas are absorbed by said liquor to form foul liquor, withdrawing said foul liquor from contact with said gas, subjecting said foul liquor to heating at a temperature below the boiling point of said liquor but above the dissociation temperature of the volatilizable ammonium salts of said liquor, whereby a major portion of the said ammonium salts are dissociated with the elimination from said liquor of a major proportion of its hydrogen sulfid and other acid gases and a minor proportion of its ammonia, to form purified liquor, cooling the major portion of said purified liquor and contacting said purified liquor with a fresh portion of crude gas, subjecting the minor portion of said purified liquor to boiling to distil off therefrom substantially all of its volatilizable gases, cooling the boiled liquor and contacting the cooled liquor with a portion of crude gas after the latter has been contacted with said purified liquor, mixing with the gases eliminated from said foul liquor sufficient oxygen to oxidize the hydrogen sulfid of said gases to water and sulfur dioxid, contacting such mixture with oxid of iron maintained at a reactive temperature, whereby the oxygen in the said gas mixture is transferred to the said hydrogen sulfid to oxidize the latter to water, sulfur dioxid and some sulfur trioxid, which products in the presence of the ammonia of said gas mixture combine with the ammonia to form ammonium sulfite and some ammonium sulfate, cooling the gases after contacting them with said iron oxid and removing the ammonium salts from the residual gases.

16. The process of recovering salt of ammonium from crude gas which comprises contacting said gas with a purified ammonia liquor containing free ammonia, whereby the ammonia, the hydrogen sulfid and carbon dioxid of the crude gas are absorbed by said liquor to form foul liquor, withdrawing said foul liquor from contact with said gas, subjecting said foul liquor to heating by hot purified liquor, further heating said foul liquor at a temperature below the boiling point of the same until a major portion of the ammonium salts of said liquor are dissociated with the elimination from said liquor of the major portion of its acid components and a minor portion of its ammonia, to form purified liquor, cooling the major portion of said purified liquor by a fresh portion of foul liquor, and contacting the cooled purified liquor with a fresh portion of crude gas, subjecting the minor portion of said purified liquor to boiling to distil off therefrom substantially all of its volatilizable gases, contacting such distilled gases with another portion of purified liquor, and adding the unabsorbed portion of such distilled gases to the gases eliminated from another portion of said foul liquor, subjecting a fraction of the boiled minor portion of said purified liquor to further boiling with lime to expel its fixed ammonia, adding the ammonia so expelled to the ammonia distilled from the minor portion of said purified liquor, cooling the residual portion of the boiled minor portion of said purified liquor and contacting it with another portion of crude gas after the latter has been contacted with said purified liquor and then adding it to the purified liquor to be used to scrub a fresh portion of crude gas, mixing with the gases eliminated from said foul liquor a sufficient proportion of air to furnish oxygen to oxidize somewhat more of the hydrogen sulfid of said gases than the proportion equivalent to the ammonia content of said gases; contacting said gaseous mixture with oxid of iron maintained at a temperature such that it will react to transfer the oxygen of the gas mixture to said hydrogen sulfid, thereby oxidizing the latter to water and sulfur dioxid chiefly which, in the presence of the ammonia of said gas mixture, react with said ammonia to form ammonium sulfite, chiefly, cooling the gas mixture after the latter has been contacted with said iron oxid, and separating the oxidized sulfur salt of ammonium formed from the residual gases.

Signed at New York city in the county of New York and State of New York this 12th day of February A. D. 1910.

HENRY L. DOHERTY.

Witnesses:
L. G. COLEMAN,
THOS. I. CARTER.